UNITED STATES PATENT OFFICE.

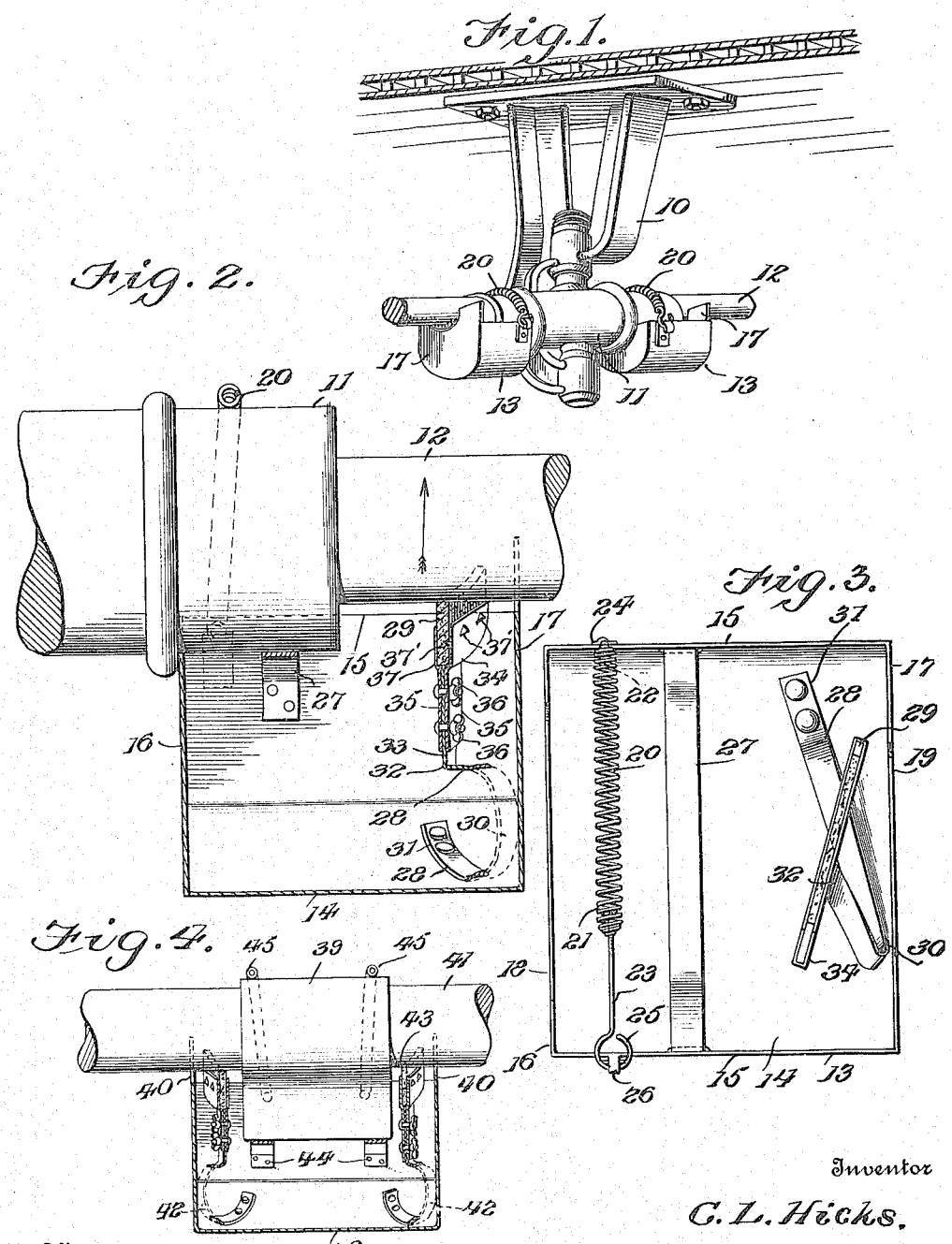

CHARLES L. HICKS, OF LIBERTY, SOUTH CAROLINA.

COMBINATION DRIP-PAN AND WIPER.

1,129,390.   Specification of Letters Patent.   Patented Feb. 23, 1915.

Application filed March 21, 1914. Serial No. 826,391.

*To all whom it may concern:*

Be it known that I, CHARLES L. HICKS, citizen of the United States, residing at Liberty, in the county of Pickens and State of South Carolina, have invented certain new and useful Improvements in Combination Drip-Pans and Wipers, of which the following is a specification.

This invention relates to a combination drip pan and wiper for journals or bearings especially designed for use in connection with overhead shafting or any other similar adaptation.

The primary object of the invention is to provide a device of the above described character which may be readily attached to or detached from the journal and so constructed as to be adapted for use in connection with journals of various forms.

A further object of the invention is to provide a drip pan and wiper so constructed as to resiliently hold the wiper against the shaft which it engages to effectually remove the grease therefrom, the wiper being so constructed and arranged within the drip pan as to normally bear resiliently against the side faces of the shaft as well as to bear against the under face thereof.

The invention has as a further object to provide a combined drip pan and wiper wherein the pad carried by the wiper is readily removable so that new pads may be employed as desired.

A further object of the invention is to provide a device of the above described character wherein the pad carried by the wiper will be resiliently supported both for vertical and transverse movement.

With these and other objects in view, my invention will be more fully described, illustrated in the accompanying drawing and then specifically pointed out in the claims which are attached to and form a part of this application.

In the drawings, Figure 1 is a perspective view showing my improved combined drip pan and wiper applied to the journal of an overhead shaft, Fig. 2 is a longitudinal sectional view especially showing the wiper and the resilient support therefor, the journal being shown in full lines, Fig. 3 is a top plan view of the device, and Fig. 4 is a longitudinal sectional view showing a modified form of the invention, the journal being shown in perspective.

Corresponding and like parts are referred to in the following description and indicated in all the views of the drawing by the same reference characters.

My improved combined drip pan and wiper is especially designed for use upon the journals of machinery employed in cotton mills, the invention seeking to provide a construction such as will effectually prevent the excess lubricant from the journal from following the shaft to drip therefrom, and will also provide a receptacle which may be so positioned upon the journal as to catch any lubricant dripping directly from the journal, the wiper contacting with the shaft in such a manner as to direct the lubricant collected thereby into the receptacle.

Referring more particularly to the drawing, I have conventionally shown for the purpose of illustration a hanger 10 carrying a journal box 11 in which is mounted a shaft 12. The subject of the present invention includes a receptacle 13 which is preferably formed of suitable sheet metal and which may, of course, be made any desired size. The receptacle 13 is preferably formed with a concavo convex bottom wall 14 which is extended to provide integrally formed side walls 15 which are connected by the end walls 16 and 17. The end wall 16 terminates at its free extremity flush with the upper edges of the side walls 15 and is arcuately recessed as at 18 to conform to the outer face of the journal 11. The end wall 17 preferably extends above the side walls 15 and is also arcuately recessed as at 19 to receive the shaft 12.

As shown in Figs. 1 and 2 of the drawing, the receptacle is designed to be supported upon the journal box 11, with the end wall 16 resting against the outer face thereof and the end wall 17 disposed adjacent the shaft 12, the receptacle being of such length as to space the end wall 17 beyond the adjacent end of the journal box. To resiliently support the receptacle in such position, a flexible strap 20 is employed which preferably includes a helical spring 21 the convolutions of which are reduced at the extremities thereof to engage the attaching rods 22 and 23, such rods being received interiorly of the spring and sliding freely therein. The securing rod 22 is attached at one extremity to one side wall 15 as at 24 while the rod 23 is bent to provide a terminal eye 25 designed to engage a hook 26 secured to the opposite side wall 15.

The strap 20 is preferably disposed adjacent the end wall 16 of the receptacle and is designed to extend over the shaft to engage one extremity of the journal box 11, thus securing the receptacle in position. It will be noted that by this construction the receptacle is resiliently supported in place and may be readily attached to or detached from the journal box. A transversely extending truss 27 is arranged within the receptacle preferably in alinement with the inner extremity of the arcuate recess 18 formed in the end wall 16 thereof, the truss being secured by its extremities to the side walls 15 and arranged forwardly of the strap 20. The truss 27 is disposed to bear against the under face of the journal box 11 and it will be noted that by this construction the receptacle will be caused to fulcrum upon the truss by the strap, thus holding the adjacent edges of the end wall 17 slightly away from the shaft 12 to prevent wearing thereof.

Arranged within the receptacle adjacent the end wall 17 thereof is a resilient support 28 which carries at its free extremity a wiper 29. The support 28 is preferably formed from a strip of suitable sheet metal and is longitudinally bowed as at 30, the extremity 31 thereof seating against the concave inner face of the bottom wall 14 of the receptacle and being secured thereto. At the upper extremity of the bowed portion 30 the strip is bent upon itself as at 32 to extend in substantially vertical relation to such bowed portion and is slightly twisted so that the free extremity 33 thereof is arranged obliquely within the receptacle, the free extremity 33 terminating adjacent the inner extremity of the recess 19 formed in the end wall 17. Detachably secured to the free extremity 33 of the support is a socket member 34 which includes opposed members 35 preferably secured by thumb screws 36 upon opposite faces of the extremity 33 of the support. Each of said members 35 is longitudinally bent adjacent one extremity and is laterally enlarged to provide an arcuate head 37, the heads of said members having spurs 37' struck therefrom and being disposed to engage the wiper 29 which is also arcuate in shape. It will be observed that by this construction, the members 35 may be readily released to free the wiper 29 thus making it easily possible to remove the wiper. The wiper 29 may be formed of asbestos, felt, or any other suitable material.

Particular attention is directed to the angular disposition of the wiper as well as the arrangement of said wiper within the receptacle. It will be noted that the working face of the wiper is normally held by the support 28 above the adjacent edges of the arcuate recess 19, to bear against the shaft 12 and being obliquely arranged with relation to said shaft, the extremities thereof will be caused to resiliently bear against the side faces of the shaft to effectually remove any excess lubricant therefrom. This is an especial feature of advantage in my invention in that the wiper is at all times resiliently held, not only against the under face of the shaft but against the side faces thereof as well.

In Fig. 4 of the drawing I have illustrated a modified form of my invention wherein the receptacle 38 is made sufficiently long to embrace the journal box 39, the journal box being conventionally shown. In this form of the invention, the receptacle is constructed substantially in accordance with the preferred form of the invention, the end walls 40 extending above the side walls of the receptacle and being arcuately recessed to accommodate the shaft 41, also conventionally shown. Secured within the receptacle adjacent the end walls 40 are supports 42, each of said supports being identical in construction with the support used in the preferred form of the invention and being similarly arranged within the receptacle. Said supports each carry a wiper 43 contacting with the shaft 31 upon each side of the journal box 39. Transversely extending trusses 44 are disposed within the receptacle, said trusses being so positioned as to contact with the under face of the journal box adjacent the ends thereof. The receptacle is supported in position by a pair of straps 45 similar in construction to the straps employed in the preferred form of the invention, said straps 45 extending over the shaft 41 and engaging the journal box 39 at each extremity. It will thus be noted that in this form of the invention, excess lubricant from the journal is collected by the wipers 43 at each end thereof. The wipers 43 are resiliently supported within the receptacle and are obliquely arranged therein so as to normally contact with the side faces of the shaft 41 as well as the under face thereof. In thus arranging the wipers obliquely to the axis of rotation of the shaft, said wipers are caused to act upon a relatively large area of the shaft to more effectually remove any excess lubricant therefrom. Furthermore, assuming the shaft to be revolving in the direction of the arrow shown in Fig. 2 of the drawings, the adjacent oblique face of the wiper will direct the lubricant collected thereby inwardly upon the shaft to fall into the receptacle. As will be obvious, this is a decided feature of advantage.

From the foregoing description it will therefore be seen that I provide a very simple and efficient structure for the purpose intended, such as may be readily manufactured and sold, and such as may be readily applied to journal boxes as usually constructed.

Having thus described my invention, what I claim as new is:

1. A device of the character described including a receptacle adapted for connection to a journal box, means for supporting the receptacle in position, a support carried by the receptacle, socket members carried by the support, a wiper carried by said socket members, said wiper being arranged to contact with the shaft carried by the journal box, and means detachably connecting said socket members with the support and maintaining said members in engagement with the wiper.

2. A device of the character described including a receptacle adapted for attachment to a journal box, means for supporting the receptacle in position, a resilient support carried by the receptacle, said support being formed from a strip of metal longitudinally bowed intermediate its ends, the free extremity of the strip being disposed to extend vertically of and in oblique relation to said bowed portion, socket members carried at the free extremity of the support, and a wiper detachably engaged by said socket members, said wiper being arranged to contact with the shaft carried by said journal box.

3. A device of the character described including a receptacle adapted for attachment to a journal box, means for supporting the receptacle in position, a support carried by the receptacle, socket members carried by the support and arranged obliquely within the receptacle and a wiper carried by said socket members, said wiper being arranged to contact with the shaft carried by said journal box.

4. A device of the character described including a receptacle adapted for attachment to a journal box, a truss arranged within the receptacle and adapted to contact with the under face of the journal box, a strap resiliently supporting the receptacle, said strap embracing the journal box and being secured to the receptacle on one side of said truss, and a wiper resiliently supported by the receptacle upon the opposite side of said truss, said wiper being disposed to contact with the shaft carried by the journal box.

5. A device of the character described including a receptacle adapted for attachment to a journal box, means for supporting the receptacle in position, a support carried by the receptacle, socket members carried by the support, said socket members being longitudinally bowed and formed with laterally enlarged arcuate heads, and a pad detachably engaged by said heads, said pad being disposed to contact with the shaft carried by said journal box.

6. A device of the character described including a receptacle adapted for attachment to a journal box, a shaft wiper carried by the receptacle and arranged to contact with the shaft carried by the journal box, means resiliently supporting the receptacle in position adjacent the shaft and acting to urge the receptacle toward the shaft, and a stop carried by the receptacle and acting to limit the movement thereof, in the same direction.

7. A device of the character described including a receptacle adapted for attachment to a journal box and having end walls, one of said end walls being recessed to embrace one extremity of the journal box and the other of said walls being recessed to receive the shaft carried by the journal box, a strap resiliently supporting the receptacle in position, said strap having detachable connection with the receptacle and embracing the adjacent extremity of the journal box, a truss disposed within the receptacle and arranged to abut the lower face of said extremity of the journal box, and a wiper carried by the receptacle and arranged to contact with the said shaft.

8. A device of the character described including a receptacle adapted for attachment to a journal box, one wall of the receptacle being arranged to contact with the journal box and another wall of the receptacle being disposed to confront the shaft carried by the journal box, a shaft wiper supported by the receptacle, a stop disposed within the receptacle and arranged for engagement with the journal box, and a strap carried by the receptacle and resiliently supporting the receptacle in position, said strap being connected with the receptacle upon one side of said stop whereby the receptacle will be caused to fulcrum upon said stop to maintain the wall of the receptacle confronting the shaft in spaced relation to the shaft.

9. A device of the character described including a receptacle adapted for attachment to a journal box, a wiper carried by the receptacle and disposed to contact with a shaft carried by the journal box, and means for resiliently supporting the receptacle in position, said means including a spring connected, at one extremity, with one wall of the receptacle and having detachable connection at its opposite extremity, with the opposite wall of the receptacle, the said spring being disposed to embrace the journal box.

10. A device of the character described including a receptacle adapted for attachment to a journal box, a wiper carried by the receptacle and disposed to contact with a shaft carried by said journal box, and means for resiliently supporting the receptacle in position, said means including a helical spring, an attaching rod connected to said spring at one extremity and slidable within the convolutions thereof, and means carried by the opposite extremity of the spring and arranged to engage the receptacle, the said spring being disposed to embrace the journal box.

In testimony whereof I affix my signature in presence of two witnesses.

CHARLES L. HICKS. [L. S.]

Witnesses:
C. W. RICE,
H. A. KEMMORE.